United States Patent [19]
Ayers

[11] Patent Number: 5,675,861
[45] Date of Patent: Oct. 14, 1997

[54] WIPER REST APPARATUS

[76] Inventor: James T. Ayers, 4891 Erin La., Melbourne, Fla. 32940

[21] Appl. No.: 779,836

[22] Filed: Jan. 7, 1997

[51] Int. Cl.$^6$ .................................................. B60S 1/04
[52] U.S. Cl. ........................ 15/250.19; 15/250.001; 15/250.16; 15/257.01
[58] Field of Search .................. 15/250.19, 250.16, 15/250.001, 250.351, 250.48, 257.01; 296/192, 194

[56] References Cited

U.S. PATENT DOCUMENTS 4,765,019 8/1988 Ochino ........................... 15/250.19
5,101,531 4/1992 Edwards et al. ................. 15/250.19

FOREIGN PATENT DOCUMENTS 63551 4/1983 Japan ................................. 15/250.19

*Primary Examiner*—Gary K. Graham

[57] ABSTRACT

A new Wiper Rest Apparatus for protecting a rubber wiper blade when not in use thereby extending the life of the rubber wiper blade. The inventive device includes a base portion and a rotor configured to receive a blade support member and the rubber wiper blade supported thereon.

4 Claims, 3 Drawing Sheets

WIPER REST APPARATUS

BACKGROUND OF THE INVENTION

1. Field of the Invention

The present invention relates to wiper support structures and more particularly pertains to a new Wiper Rest Apparatus for protecting a rubber wiper blade when not in use thereby extending the life of the rubber wiper blade.

2. Description of the Prior Art

The use of wiper support structures is known in the prior art. More specifically, wiper support structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art wiper support structures include U.S. Pat. No. 5,035,023; U.S. Pat. No. 4,765,019 and U.S. Pat. No. 4,969,228.

While these devices fulfill their respective, particular objectives and requirements, the aforementioned patents do not disclose a new Wiper Rest Apparatus. The inventive device includes a base portion and a rotor configured to receive a windshield wiper arm and the rubber wiper blade supported thereon.

In these respects, the Wiper Rest Apparatus according to the present invention substantially departs from the conventional concepts and designs of the prior art, and in so doing provides an apparatus primarily developed for the purpose of protecting a rubber wiper blade when not in use thereby extending the life of the rubber wiper blade.

SUMMARY OF THE INVENTION

In view of the foregoing disadvantages inherent in the known types of wiper support structures now present in the prior art, the present invention provides a new Wiper Rest Apparatus construction wherein the same can be utilized for protecting a rubber wiper blade when not in use thereby extending the life of the rubber wiper blade.

The general purpose of the present invention, which will be described subsequently in greater detail, is to provide a new Wiper Rest Apparatus and method which has many of the advantages of the wiper support structures mentioned heretofore and many novel features that result in a new Wiper Rest Apparatus which is not anticipated, rendered obvious, suggested, or even implied by any of the prior art wiper support structures, either alone or in any combination thereof.

To attain this, the present invention generally comprises a base portion and a rotor configured to receive a windshield wiper arm and the rubber wiper blade supported thereon.

There has thus been outlined rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Wiper Rest Apparatus and method which has many of the advantages of the wiper support structures mentioned heretofore and many novel features that result in a new Wiper Rest Apparatus which is not anticipated, rendered obvious, suggested, or even implied by any of the prior art wiper support structures, either alone or in any combination thereof.

It is another object of the present invention to provide a new Wiper Rest Apparatus which may be easily and efficiently manufactured and marketed.

It is a further object of the present invention to provide a new Wiper Rest Apparatus which is of a durable and reliable construction.

An even further object of the present invention is to provide a new Wiper Rest Apparatus which is susceptible of a low cost of manufacture with regard to both materials and labor, and which accordingly is then susceptible of low prices of sale to the consuming public, thereby making such wiper rest apparatus economically available to the buying public.

Still yet another object of the present invention is to provide a new Wiper Rest Apparatus which provides in the apparatuses and methods of the prior art some of the advantages thereof, while simultaneously overcoming some of the disadvantages normally associated therewith.

Still another object of the present invention is to provide a new Wiper Rest Apparatus for protecting a rubber wiper blade when not in use thereby extending the life of the rubber wiper blade.

Yet another object of the present invention is to provide a new Wiper Rest Apparatus which includes a base portion and a rotor configured to receive a blade support member and the rubber wiper blade supported thereon.

Still yet another object of the present invention is to provide a new Wiper Rest Apparatus that reduces folding or cracking or other deformation of the rubber wiper blade by suspending the rubber wiper blade above a windshield or other glass surface on which the rubber wiper blade travels when not in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
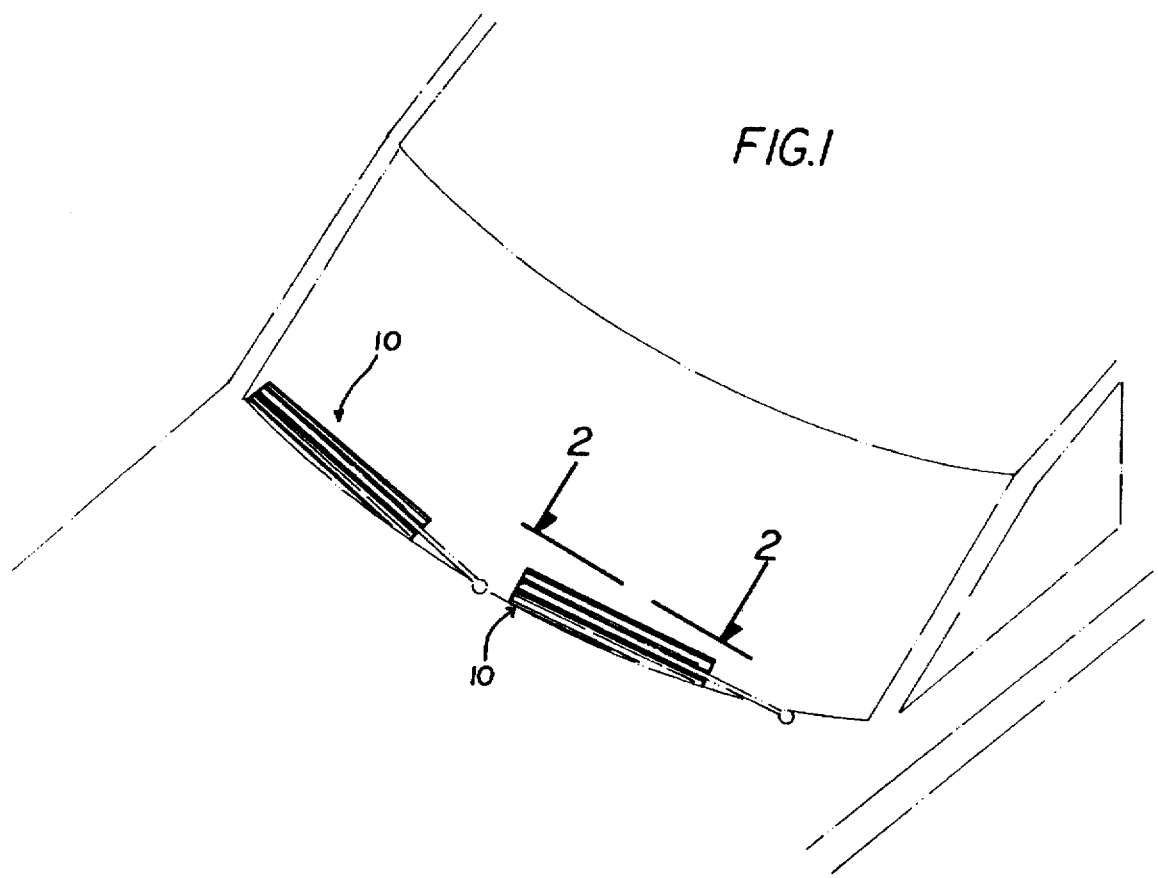
FIG. 1 is a view of a new Wiper Rest Apparatus according to the present invention in association with a vehicular windshield.
Figure 2:
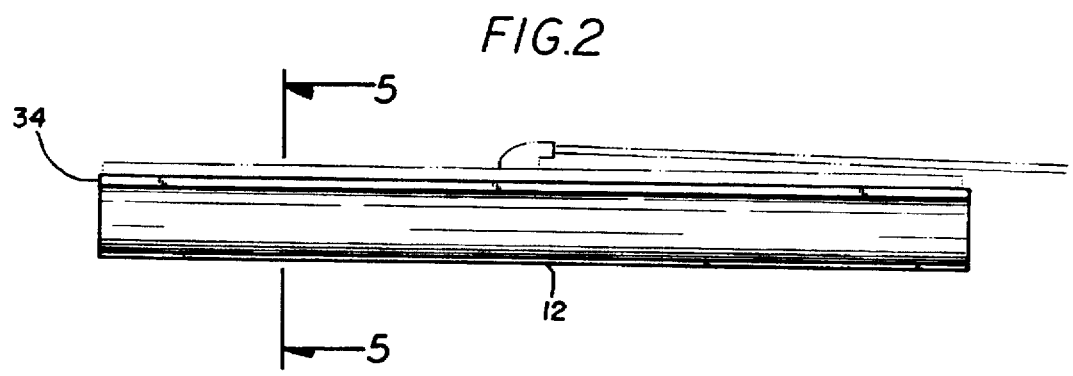
FIG. 2 is a view taken along line 2—2 in FIG. 1.
Figure 3:
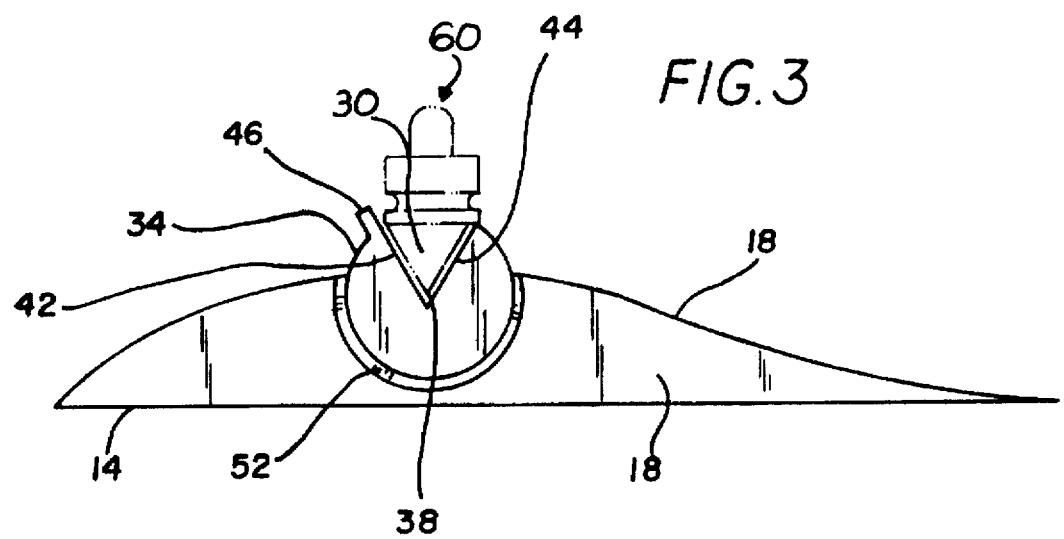
FIG. 3 is a cross sectional view of the present invention including a blade support member and rubber wiper blade.
Figure 4:
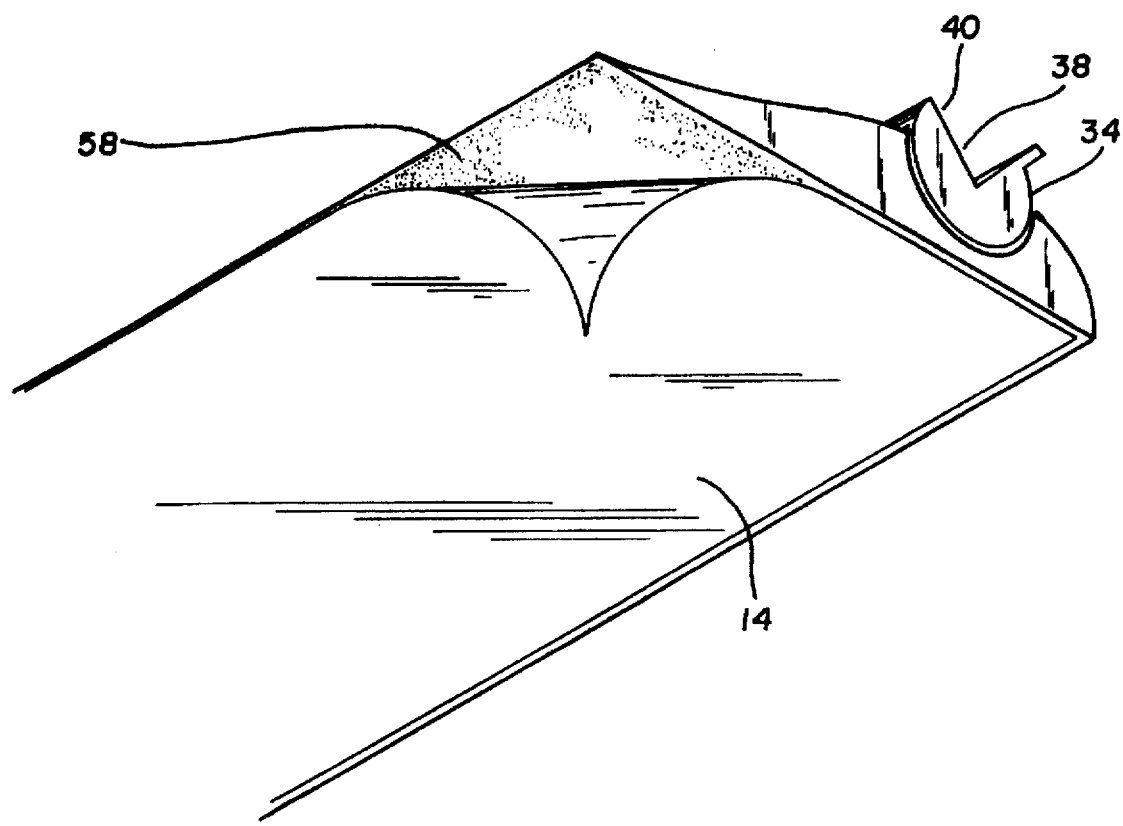
FIG. 4 is a fragmented view of the invention utilizing a base portion with an adhesive backing.
Figure 5:
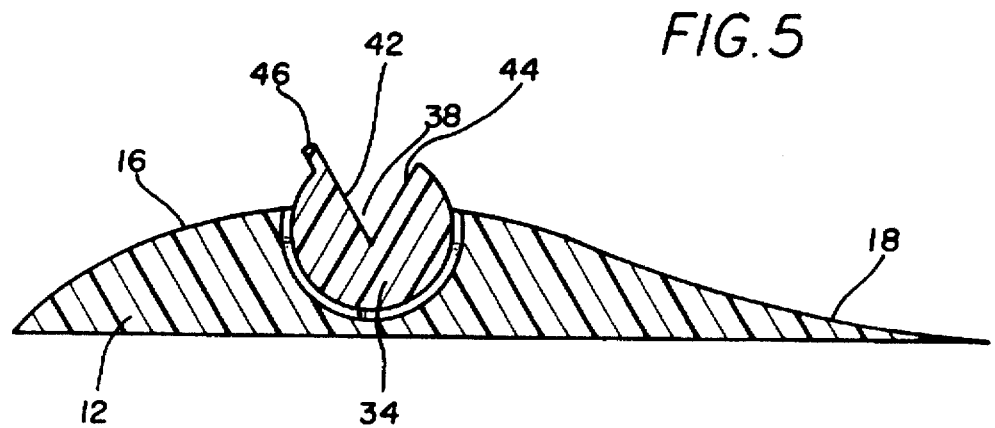
FIG. 5 is a cross sectional view taken along line 5—5 of FIG. 2.
Figure 6:
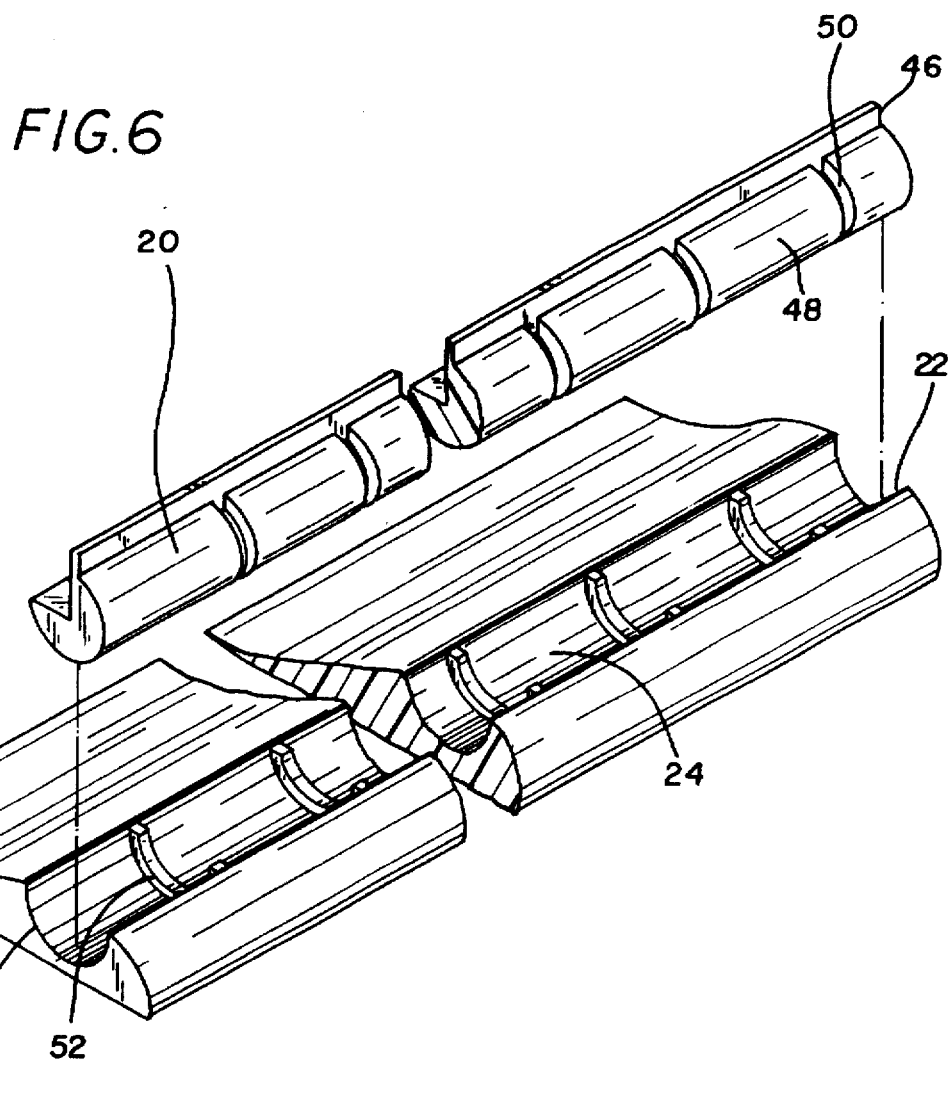
FIG. 6 is an exploded isometric illustration of the present invention illustrating the various components, their configuration and relationship.

With reference now to the drawings, and in particular to FIGS. 1 through 6 thereof, a new Wiper Rest Apparatus embodying the principles and concepts of the present invention and generally designated by the reference numeral 10 will be described.

More specifically, it will be noted that the Wiper Rest Apparatus 10 comprises a base portion 12 affixed to a vehicle windshield 26 and a substantially cylindrical rotor 34 configured to receive a blade support member and a rubber wiper blade supported thereon when the windshield wiper arm is not in use.

As best illustrated in FIGS. 1 through 6, it can be shown that the base portion 12 has a flat base 14 that is affixed to the vehicle windshield, a curved upper surface 16, a downward sloping forward surface 16, and a substantially cylindrical groove 20 formed in the curved upper surface 16. The cylindrical groove has an opening 22 and an interior surface 24. The base portion 12 is affixed to a lower portion of the vehicle windshield so as to accommodate the blade support member in a rest position.

The rotor 34 is substantially cylindrical in shape and is configured to be received in the cylindrical groove 20. The rotor 34 has a longitudinal axis and a body 48 and is mounted in the base portion 12 so as to be rotatable around the longitudinal axis. The rotor has a V-shaped groove 38 formed along the longitudinal axis of the rotor. The V-shaped groove 38 has an opening 40, a first side 42 and a second side 44. The first side 42 is extended beyond the body 48 of the rotor 34 forming a lip 46 which limits the rotating motion of the rotor 34. The lip 46 prevents the first side 42 of the V-shaped groove's opening 40 from rotating beyond the opening 22 of the cylindrical groove 20 formed in the base portion 12. The opening 40 of the V-shaped groove 38 is narrower than the blade support member 60 and wider than the rubber wiper blade 30. This allows the blade support member 60 to rest on the rotor 34 while the rubber wiper blade 30 is suspended above the first side 42 and the second side 44 of the V-shaped groove 38.

A plurality of annular grooves 50 are formed in the body 48 of the rotor 34 and a plurality of raised annular structures 52 are formed in the interior surface 24 of the cylindrical groove 20. The annular grooves 50 are configured to receive the raised annular ring structures 52 so as to prevent any lateral motion of the rotor 34 in relation to the base portion 12. The annular grooves 50 are also configured to slidably engage the raised annular structures 52 to allow the rotor 43 to rotate.

In use, the base portion 12 and rotor 34 are constructed of flexible, high impact plastic so that they may conform to the contour of the windshield to which the base portion 12 is affixed. One each of the base portion 12 and the rotor 34 are provided for each blade support member. The base portion 12 can be affixed to the windshield using an adhesive 58 or using screws. The base portion is mounted on the lower portion of the windshield so that a blade support member returning to its rest position will cause the rubber wiper blade to slide over the downward sloping forward surface 18 of the base portion 12. When the blade support member contacts the rotor 34 it will enter the V-shaped groove 38 causing the rotor 34 to rotate. In its final rest position the blade support member 60 is supported by the rotor 34 while the rubber wiper blade is suspended above the sides 42, 44 of the V-shaped groove 38, and the rubber wiper blade has no contact with any surfaces. This reduces the chances for the rubber wiper blade to bend, crack, or otherwise deform as a result of being constantly in contact with the windshield. Inside the V-shaped groove 38 the rubber wiper blade is also protected from the elements extending the useable life of the rubber wiper blade.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. In a windshield wiper assembly including a rubber wiper blade supported by a blade support member for movement over a windshield and a wiper rest apparatus for supporting said blade off said windshield when said blade support member is in a rest position, said rest apparatus comprising;

a base portion having a flat base, a curved upper surface, a downward sloping forward surface, and a substantially cylindrical groove formed in the upper surface of the base portion, the substantially cylindrical groove having an opening and an interior surface;

a substantially cylindrical rotor having a longitudinal axis and a body adapted to be received in the cylindrical groove so that the rotor is rotatable around its longitudinal axis, the rotor having a V-shaped groove formed along the longitudinal axis of the rotor, the V-shaped notch having an opening and a first side and a second side wherein the first side is extended beyond the body of the rotor forming a lip which limits the pivoting motion of the rotor so that the lip formed on the first side of the V-shaped notch never passes beyond the opening of the substantially cylindrical groove, the opening of the V-shaped groove being narrower than the blade support member and wider than the rubber wiper blade so that when the rubber wiper blade contacts the base portion, the rubber wiper blade slides up the downward sloping forward surface and is received in the V-shaped notch, the blade support member causes the rotor to rotate, and the V-shaped notch supports the blade support member while suspending the rubber wiper blade above the first side and the second side of the V-shaped groove; and a plurality of annular grooves formed in the body of the rotor and a plurality of raised annular structures formed on the interior surface of the substantially cylindrical groove wherein the annular grooves receive the raised annular structures preventing any lateral motion of the rotor relative to the base portion and wherein the annular grooves slidably engage the raised annular structures allowing the rotor to rotate.

2. In the windshield wiper assembly of claim 1, wherein the base portion is affixed to a lower portion of the windshield so that as the blade support member moves into the rest position the rubber wiper blade mounted on the blade support member slides over the downward sloping forward surface and is received by the opening of the V-shaped groove formed in the rotor causing the rotor to rotate so the blade support member is supported on the rotor and the rubber wiper blade is suspended above the sides of the V-shaped notch.

3. In the windshield wiper assembly of claim 1, wherein the base portion and the rotor are constructed of flexible, high impact plastic so that the base portion and the rotor may conform to a contour of the windshield to which the base portion is affixed.

4. In the windshield wiper assembly of claim 1, wherein the flat base of the base portion is affixed to a lower portion of the vehicle windshield using an adhesive.

* * * * *